United States Patent
Watanabe et al.

(10) Patent No.: US 10,657,171 B2
(45) Date of Patent: May 19, 2020

(54) IMAGE SEARCH DEVICE AND METHOD FOR SEARCHING IMAGE

(71) Applicant: Hitachi, Ltd., Chiyoda-ku, Tokyo (JP)

(72) Inventors: Yuki Watanabe, Tokyo (JP); Atsushi Hiroike, Tokyo (JP); Kenichi Yoneji, Tokyo (JP); Nobuo Nukaga, Tokyo (JP); Naoto Akira, Tokyo (JP); Tomoaki Yoshinaga, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 483 days.

(21) Appl. No.: 15/556,994

(22) PCT Filed: Mar. 13, 2015

(86) PCT No.: PCT/JP2015/057516
§ 371 (c)(1),
(2) Date: Sep. 8, 2017

(87) PCT Pub. No.: WO2016/147260
PCT Pub. Date: Sep. 22, 2016

(65) Prior Publication Data
US 2018/0060356 A1   Mar. 1, 2018

(51) Int. Cl.
*G06F 16/583* (2019.01)
*G06F 16/2455* (2019.01)

(52) U.S. Cl.
CPC ........ *G06F 16/583* (2019.01); *G06F 16/2455* (2019.01)

(58) Field of Classification Search
None
See application file for complete search history.

(56) References Cited

U.S. PATENT DOCUMENTS

2008/0069480 A1*  3/2008  Aarabi ............... G06F 16/5854
                                                     382/305
2008/0285855 A1* 11/2008  Shiiyama ............ G06K 9/6203
                                                     382/190
(Continued)

FOREIGN PATENT DOCUMENTS

JP      2008-129942 A    6/2008
JP      2009-245304 A   10/2009
(Continued)

OTHER PUBLICATIONS

International Search Report (PCT/ISA/210) issued in PCT Application No. PCT/JP2015/057516 dated Jun. 9, 2015 with English translation (five pages).
(Continued)

*Primary Examiner* — Christopher J Raab
(74) *Attorney, Agent, or Firm* — Crowell & Moring LLP

(57) ABSTRACT

An image search device searching an image from an image database storing a recorded image, one or more types of feature values, and propagation information that indicates a link between a same type of the feature values of the recorded image, the device acquires a first image and the one or more types of feature values of the first image, records the first image and the feature values in the image database, calculates a propagation intensity indicating similarity or sameness between the types of feature values of the recorded image and the types of feature values of the first image, and includes in the propagation information a link between the types of feature values of the first image and the types of feature values of the recorded image for which the propagation intensity between the types of feature values of the recorded image and the types of feature values of the first image is at a maximum value.

14 Claims, 13 Drawing Sheets

(56) References Cited

U.S. PATENT DOCUMENTS

| | | | |
|---|---|---|---|
| 2012/0250993 A1* | 10/2012 | Iso | G06T 5/002 |
| | | | 382/167 |
| 2013/0010154 A1* | 1/2013 | Maeda | G06F 16/5854 |
| | | | 348/222.1 |
| 2014/0040273 A1 | 2/2014 | Cooper et al. | |
| 2014/0301623 A1* | 10/2014 | Wang | A61B 5/055 |
| | | | 382/131 |
| 2015/0117762 A1* | 4/2015 | Shibata | H04N 19/97 |
| | | | 382/159 |

FOREIGN PATENT DOCUMENTS

| | | |
|---|---|---|
| JP | 2010-250529 A | 11/2010 |
| JP | 2014-32656 A | 2/2014 |
| WO | WO 2012/101697 A1 | 8/2012 |

OTHER PUBLICATIONS

Japanese-language Written Opinion (PCT/ISA/237) issued in PCT Application No. PCT/JP2015/057516 dated Jun. 9, 2015 (three pages).

\* cited by examiner

| 300 | 301 | 302 | 303 | 304 |
|---|---|---|---|---|
| | IMAGE ID | IMAGE DATA | ATTRIBUTE 1 FEATURE VALUE | ATTRIBUTE 2 FEATURE VALUE |
| | 1 | Binary | [39, 223, 192, ...] | 1 |
| | 2 | Binary | [19, 226, 17, ...] | 1 |
| | 3 | Binary | [29, 231, 207, ...] | 2 |
| | 4 | Binary | [248, 35, 158, ...] | 3 |
| | 5 | Binary | [239, 27, 163, ...] | 3 |
| | 6 | Binary | [27, 239, 222, ...] | 4 |
| | ... | ... | ... | ... |

| 310 | 311 | 312 | 313 | 314 | 315 |
|---|---|---|---|---|---|
| | PROPAGATION INFORMATION ID | ATTRIBUTE ID | PROPAGATION SOURCE | PROPAGATION DESTINATION | PROPAGATION INTENSITY |
| 411 | 1 | 2 | 1 | 2 | 1.0 |
| 421 | 2 | 1 | 1 | 3 | 0.8 |
| | 3 | 1 | 4 | 5 | 0.7 |
| | 4 | 2 | 4 | 5 | 1.0 |
| | 5 | 1 | 3 | 6 | 0.9 |
| | ... | ... | ... | ... | ... |

FIG.3

IMAGE SEARCH DEVICE AND METHOD FOR SEARCHING IMAGE

BACKGROUND OF THE INVENTION

The present invention is related to an image search device and a method for searching image.

As a result of digital archiving of television footage and increased popularity of video distribution services on the internet, there is an increased need for searching and classifying large scale image data at high speed. Also, there is increased expectation for analysis of surveillance footage accumulated for security purposes. Due to the difficulty involved in manually adding text information to large numbers of images, an image search technique using feature values in the image is being sought.

Large scale and high speed similar image search systems have been put into practical use up to now, and a technique has been proposed in which, by extracting image feature values in advance and putting them in a database, images that are visually similar to a query image are searched at high speed.

JP 2010-250529 A (Patent Document 1) is a disclosure of the background art of the present technical field. Patent Document 1 indicates (see abstract) that "An image search device includes: an image database; a search request reception means that receives a query image; a similar image search means that extracts a similar image that is similar to the query image from among images recorded in the image database; and a search result display means that arranges similar images around the query image and displays in the display means search results in which the query image and the similar images are linked. If a new query image is received by the search request reception means, the search result display means maintains the linked display of search results previously displayed in the display means while adding the search results from the new query image to the original search results and displaying them in the display means."

SUMMARY OF THE INVENTION

The search system disclosed in Patent Document 1 updates search results according to interactions with users. Specifically, the search system disclosed in Patent Document 1 repeats searches using, as a new query image, an image included among the search results attained by a user-designated query image. In this manner, if the user appropriately designates the query image, it is possible to attain search results with a high level of variation pertaining to the target search.

However, in the search system disclosed in Patent Document 1, if the user only selects images with a certain appearance for the query, this presents a difficulty in terms of attaining high coverage search results for the query. That is, the coverage of the search is affected by user operation.

In order to solve the above problems, the present invention adopts a configuration described in claims. This description includes means solving the above problems, and an example of the present invention includes an image search device that searches an image from an image database that stores a recorded image, one or more types of feature values including a first type of said recorded image, and propagation information that indicates a link between a same type of the feature values of the recorded image, the image search device comprising: an image acquisition unit that acquires a first image and the one or more types of feature values of the first image, and records the first image and the feature values in the image database; an attribute propagation unit that calculates a propagation intensity indicating similarity or sameness between the types of feature values of the recorded image and the types of feature values of the first image, and includes in the propagation information a link between the types of feature values of the first image and the types of feature values of the recorded image for which the propagation intensity between the types of feature values of the recorded image and the types of feature values of the first image is at a maximum value; a query input unit that acquires a first feature value of a first type from the feature values of the recorded image stored in the image database and generates an input query including the first feature value; a query reinforcing unit that, on the basis of a correspondence indicated by the propagation information, performs a search that traverses the feature values of the recorded image starting with the first feature value, and generates an additional query including the first type of feature value of the recorded image that has feature values on a path of the search; and an image search unit that searches for images from the image database using the input query and the additional query.

According to one aspect of the present invention, it is possible to search for images with high accuracy and a high degree of coverage. Problems, configurations, and effects other than what was described above are made clear by the description of embodiments below.

BRIEF DESCRIPTIONS OF DRAWINGS

The present invention can be appreciated by the description which follows in conjunction with the following figures, wherein:

FIG. 3 is a descriptive drawing showing a configuration of an image database according to Embodiment 1;

DETAILED DESCRIPTION OF EMBODIMENTS

Figure 1:
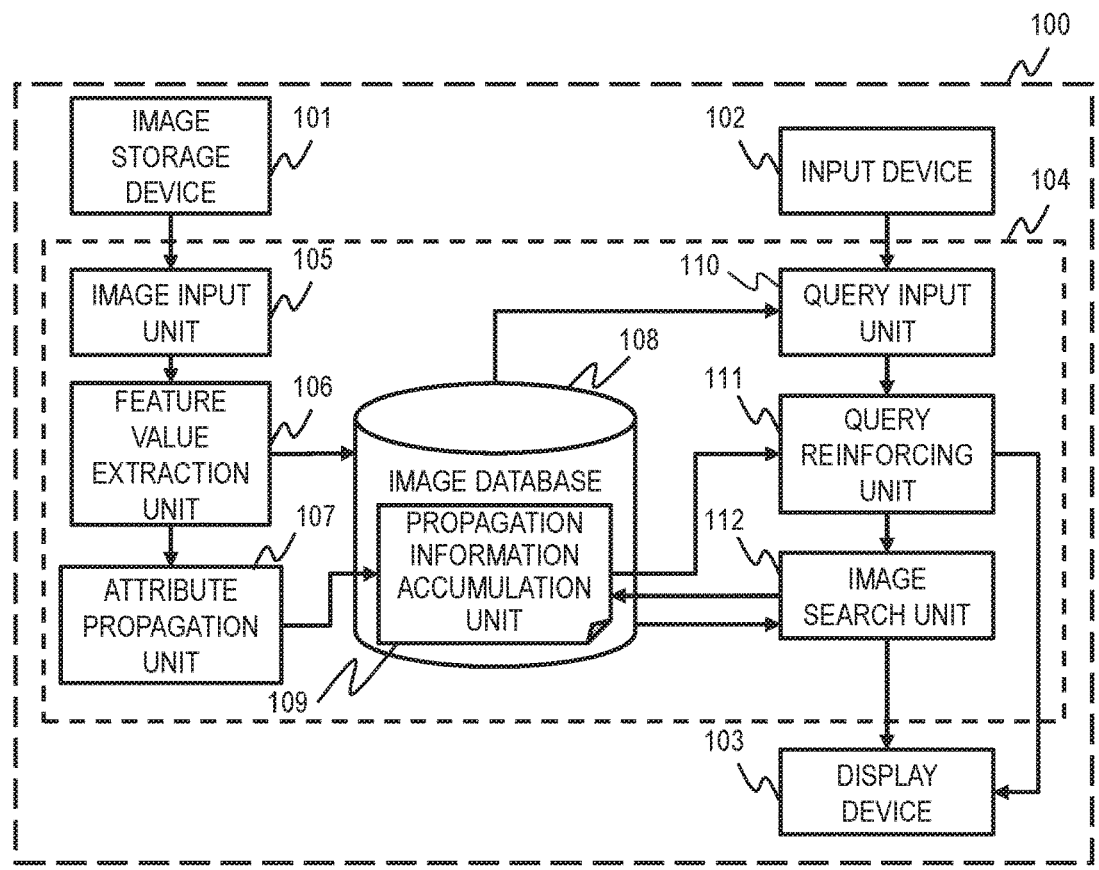
FIG. 1 is a block diagram showing a configuration example of an image search system according to Embodiment 1.

Embodiments of the present invention will be explained below with reference to attached drawings. The embodiments are merely an example for realizing the present invention, and it should be noted that the embodiments do not limit the technical scope of the present invention. The same reference characters are assigned to common components in the respective drawings.

SUMMARY OF THE EMBODIMENTS

An image search device of the embodiments extracts the feature values of one or more prescribed types of attributes from a newly recorded image and compares the feature values of the various extracted attributes with feature values of the same type of attributes of the recorded images. The image search device uses this comparison to accumulate propagation information including a link between feature values determined to have a high degree of similarity or be the same. The link can also be thought of as a link between images through the same type of feature value. In the embodiments, if there is no particular need to make a distinction, the link (propagation) between the feature values is sometimes referred to as the link (propagation) between images. In the embodiments, "image" encompasses both videos and still images.

Attributes are the parts constituting the image, and if a person is present in the image, for example, parts of the person including arms and the head are examples of attributes. The feature value indicates features of images having the attributes. Specific examples of the feature value will be described later. In the embodiments, feature values of the attributes are sometimes referred to simply as feature values.

The propagation information includes, for example, information indicating the image at the source of propagation and the image at the destination of propagation, as well as the propagation intensity. The propagation intensity will be described later. As a result, a graph structure indicating the links between the images is formed. In the embodiments, trees are included as a type of graph. The image search device can search for images that are not directly similar to the query image by traversing the graph structure.

The image search device uses the propagation information when performing a search, acquires from the database a plurality of images linked to the query image of the inputted query, and adds queries in which the acquired images are used as query images to the inputted query, thereby reinforcing the search query, for example. The image search device performs a similar image search using the reinforced query and combines the search results thereof to improve the search accuracy and coverage rate.

Embodiment 1

<System Configuration>

FIG. 1 is a block diagram showing a configuration example of an image search system 100 of Embodiment 1. The image search system 100 accumulates as propagation information a link between one or more types of feature values of an input image and recorded images having the same types of feature values with a high degree of similarity, uses the propagation information to reinforce the query, and performs a search with the reinforced query to improve the search accuracy and coverage rate.

The image search system 100 includes, for example, an image storage device 101, an input device 102, a display device 103, and an image search device 104. The image storage device 101 is a storage medium that stores still image data or video data, and is constituted of a hard disk drive installed in a computer or a network-connected storage system such as network attached storage (NAS) or a storage area network (SAN), for example. The image storage device 101 may also be cache memory that temporarily stores image data continuously inputted from a camera, for example.

The input device 102 is an input interface such as a mouse, keyboard, or touch device for transmitting user operations to the image search device 104, for example. The display device 103 is an output interface such as a liquid crystal display, for example, that is used in order to display recognition results from the image search device 104, interactive operations with the user, or the like.

<Operation of Each Part>

The image search device 104 performs a recording process of extracting information necessary to perform a search from images accumulated in the image storage device 101 and places the information in a database. The image search device 104 performs a search process using a search query designated by the user to the input device 102 to search for images similar to the search query from the image database 108 and displays this information in the display device 103.

The image search device 104 extracts feature values of one or more attributes from the image and records them in the image database 108. The image search device 104 compares the recorded feature values of the image with the same types of feature values of other recorded images, adds propagation information between highly similar or same feature values, and accumulates the propagation information in the image database.

The image search device 104 includes an image input unit 105, a feature value extraction unit 106, an attribute propagation unit 107, an image database 108, a propagation information accumulation unit 109, a query input unit 110, a query reinforcing unit 111, and an image search unit 112.

The image input unit 105 receives input of still image data or video data from the image storage device 101, and converts the inputted data to a data format that can be used in the image search device 104, according to the data format of the inputted data. If the image input unit 105 receives video data as input, the image input unit 105 performs a video decoding process that divides the footage into frames (still image data format), for example.

Also, the image input unit 105 may, as necessary, perform an extraction process on a partial region from the inputted image according to commands or the like from the user, for example. Specifically, the image input unit 105 may extract regions where a person is present from each frame and designate the image of the extracted region as data to be used internally, for example. The image data processed by the image input unit 105 is transmitted to the feature value extraction unit 106. The image input unit 105 may also receive the feature values as input and record the inputted feature values in the image database 108. In this case, the image search device 104 may omit the feature value extraction unit 106.

The feature value extraction unit 106 extracts the feature values of one or more types of attributes from the inputted images. The feature values can be compared among images having features, and are expressed as vectors of a fixed length, for example. An image feature value that is data attained by quantifying visual information such as the color and shape of the image is one example of an attribute feature value. As long as the value can be compared among images, any image information can be used as a feature value. In the aforementioned case of an image with a person therein, a moving body ID attained by tracking a moving body among frames can be used as a feature value of an attribute in addition to the image feature values such as the shape and color of the image with a person. The image information including the image and the feature values is recorded in the image database 108.

The feature value extraction unit 106 may perform a data clustering process in order to perform a high speed search when recording image feature values in the image database 108, for example. The feature value extraction unit 106 generates clusters constituted of one or more pieces of recorded data having feature values with a high degree of similarity, by a clustering process such as a k-means algorithm, for example. The degree of similarity is an index indicating the similarity between two of the same type of feature value, and is attained by substituting in distances between the two feature values to a prescribed decreasing function with a range of [0, 1], for example.

The image database 108 records a representative value of the cluster (such as a mean vector of the cluster members) and cluster member IDs, for example. During a search, the image search device 104 compares the feature value of the search query with the representative value of the cluster, for example, and performs feature value comparison between the search query and the cluster members only for clusters with a high degree of similarity, thereby reducing the processing time and enabling high speed search.

The attribute propagation unit 107 compares the feature value of each recorded image to the same type of feature value of a newly recorded image, and records a link between feature values having a high propagation intensity to the image database 108 as propagation information. The propagation intensity is an index indicating the similarity or sameness between two of the same type of feature value. An example of a propagation intensity is a value attained by a function that equals 1 if the two feature values match and equals 0 if the two feature values do not match. Therefore, even if similarity between the feature values cannot be defined, it is possible to define the propagation intensity. The above-mentioned degree of similarity is also an example of a propagation intensity. If an image has a plurality of attributes, the attribute propagation unit 107 generates one propagation intensity for each attribute, for example. Below, examples of feature values of attributes are given.

(1) As mentioned above, an image feature value attained by quantifying visual information such as the color and shape of the image itself is one example of a feature value. If the degree of similarity between image feature values is greater than or equal to a threshold, then the attribute propagation unit 107 generates propagation information between the images and sets the degree of similarity therebetween as the propagation intensity.

(2) An object ID in chronological image recognition results such as for tracking a moving body is an example of a feature value. The same object in consecutive frames has the same ID. If two frames with the same object ID are present, then the attribute propagation unit 107 generates propagation information for the same object ID in each frame and sets the propagation intensity to 1.0, for example.

(3) Information indicating the position in a fixed point observation image is an example of a feature value. If the fixed point observation image is subdivided into a prescribed grid, the attribute propagation unit 107 generates propagation information for cells in the same position over differing times and sets the propagation intensity to 1.0, for example.

(4) A user-designated tag is an example of a feature value. The attribute propagation unit 107 generates propagation information between an image with a user-designated tag and a reference image used to aid adding a tag to the image, for example. The attribute propagation unit 107 calculates the degree of similarity with another feature value between the image with the user-designated tag and the reference image and sets the calculated degree of similarity as the propagation intensity, for example. The attribute propagation unit 107 may generate the propagation information between images having the same tag and set the propagation intensity to 1.0, for example. Details of the generation process for the propagation information by tag will be described later.

(5) A search history is an example of a feature value. The attribute propagation unit 107 refers to an operation log for repeated searches and generates propagation information between the search query image and the search result image, for example, and sets the degree of similarity between the feature values used for searching the images as the propagation intensity, for example.

Figure 13:
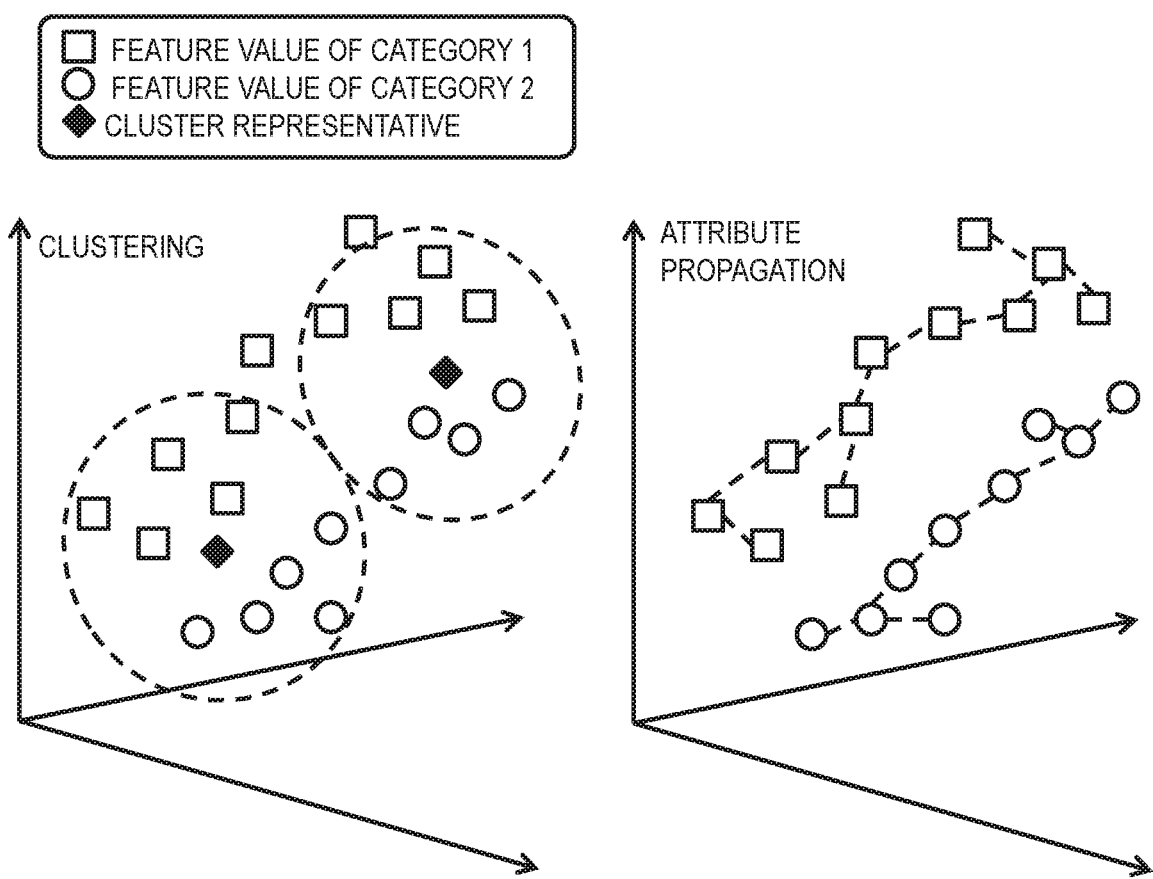
FIG. 13 is an explanatory diagram showing a clustering form and attribute propagation.

FIG. 13 shows a comparison between attribute propagation and structuring of a feature value space. Whereas clustering forms a feature value group centered on a representative vector, attribute propagation forms a graph representing links between feature values. The image search device 104 can attain links between images that are far apart in the feature value space by employing attribute propagation. The propagation information generation method will be described later with reference to FIGS. 4A to 4C.

The image database 108 retains image information attained by the aforementioned recording process. Also, the image database 108 includes a propagation information accumulation unit 109 that accumulates propagation information. The propagation information accumulation unit 109 may be disposed outside of the image database 108. The propagation information may be accumulated in the main storage unit of the client device, for example, and in this case, the image search device 104 can use the propagation information that temporarily differs for each user.

The image database 108 stores the feature values, and the image search unit 112 performs a similar image search using the feature values. The similar image search is a function of outputting data in order of greater similarity of the feature value to the query. The image search unit 112 uses the Euclidean distance between vectors, for example, to compare the feature values. The structure of the image database 108 will be described in detail later with reference to FIG. 3. The operation of each part of the recording process of the image search device 104 was described above. Next, the operation of each part of the search process of the image search device 104 will be described.

The query input unit 110 receives a query made by the user through the input device 102. If the query is for an already recorded data ID, then the feature values are acquired from the image database 108, and if an image is inputted from outside as a query, then the feature values are attained from the image by a similar process to the feature value extraction unit 106. The query reinforcing unit 111 uses the propagation information accumulated in the image database 108 to acquire the recorded data pertaining to the input query and designates the propagation information as an additional query.

The image search unit 112 uses the input query and the additional query attained in the query reinforcing unit 111 and performs the similar image search process on the image database 108. The image search unit 112 reorders the search results attained from the queries in order of degree of similarity, and, for data with the same ID, performs a consolidation process such as leaving remaining only the lower order result. Also, in this case, the degree of similarity of the results of the query added by the query reinforcing unit 111 may be weighted as necessary. The query reinforcement and the image search will be described later with reference to FIG. 6. The display device 103 displays the search results attained by the above search process, thereby displaying the search results to the user.

Figure 2:
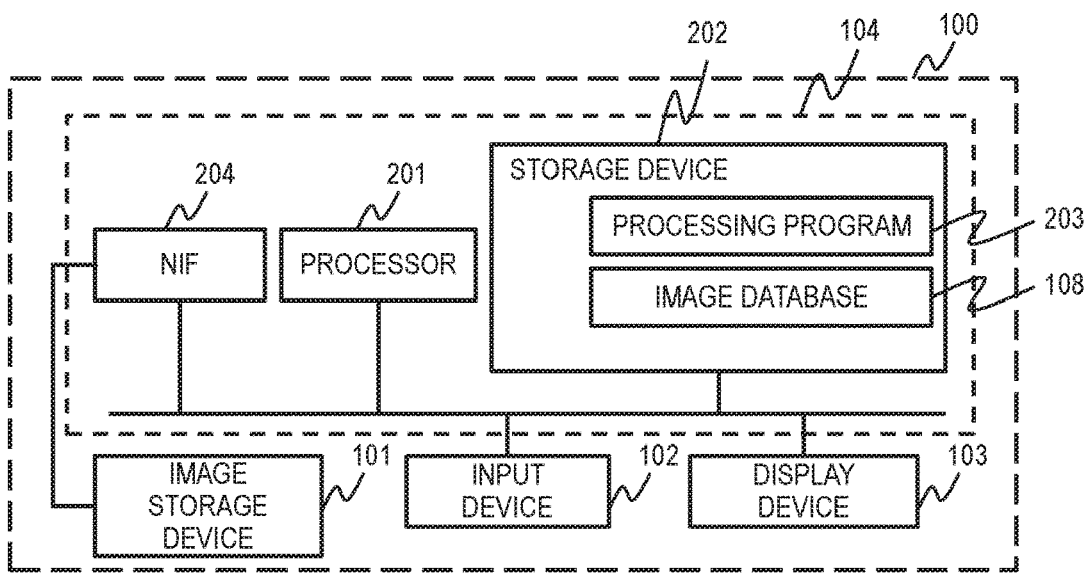
FIG. 2 is a block diagram showing a hardware configuration example of the image search system according to Embodiment 1.

FIG. 2 is a block diagram showing a hardware configuration example of an image search system 100 of the present embodiment. The image search device 104 is realized by a general computer, for example. The image search device 104 may have a processor 201 and a storage device 202 connected to each other, for example. The storage device 202 is constituted of a storage medium of any type. The storage device 202 may be configured by combining a semiconductor memory with a hard disk drive, for example.

Function units such as the image input unit 105, the feature value extraction unit 106, the attribute propagation unit 107, the image database 108, the propagation information accumulation unit 109, the query input unit 110, the query reinforcing unit 111, and the image search unit 112 are realized by the processor 201 executing processing programs 203 stored in the storage device 202. In other words, the processes executed by the respective function units are executed by the processor 201 on the basis of the processing programs 203. The data of the image database 108 is included in the storage device 202, for example.

The image search device 104 further includes a network interface device 204 (NIF) connected to the processor 201. The image storage device 101 may be an NAS or SAN connected to the image search device 104 through the network interface device 204, for example. The image storage device 101 may be included in the storage device 202.

FIG. 3 is a descriptive drawing showing a configuration of the image database 108 and a data example of the present embodiment. In the present embodiment, the information used by the system may be represented by any data structure. FIG. 3 shows an example of a table format, but a data structure selected appropriately from among a table, a list, a database, or a queue, for example, can store information.

The image database 108 includes an image table 300 that stores image information, and a propagation information table 310 that stores the links between the images, for example. Each table structure and field structure of each table in FIG. 3 are merely examples, and tables and fields may be added according to the application, for example. Also, if similar information is being stored, the table structure may be modified. For example, a table may be used in which the image table 300 is joined with the propagation information table 310.

The image table 300 includes an image ID field 301, an image data field 302, and an attribute 1 feature value field 303. If the feature value extraction unit 106 is to extract feature values of a plurality of types of attributes from the image, then the image table 300 includes a plurality of feature value fields. The image table 300 of FIG. 3 is an example in which feature values of two attributes are extracted, and includes an attribute 2 feature value field 304.

The image ID field 301 retains an identification number for each piece of image data. The image data field 302 stores image data used for displaying search results in binary, for example. The attribute 1 feature value field 303 and the attribute 2 feature value field 304 store corresponding types of feature values. The feature value is given as vector data of a fixed length, for example. The feature value may be scalar data as long as image comparison is possible, as in the feature value stored in the attribute 2 feature value field 304, for example.

The propagation information table 310 includes a propagation information ID field 311, an attribute ID field 312, a propagation source field 313, a propagation destination field 314, and a propagation intensity field 315. The propagation information ID field 311 stores an identification number for attribute propagation between images. The attribute ID field 312 stores a feature value ID of an attribute to be propagated. The feature value ID of the attribute may be managed by an application or may be managed in a database including a table.

The propagation source field 313 stores an image ID to be the source of attribute propagation. The propagation destination field 314 stores an image ID to be the source of attribute propagation. The propagation intensity field 315 stores a propagation intensity or reliability value. The greater the propagation intensity becomes in value, the closer the feature value vector distance between propagation source and propagation destination is, for example. The propagation information table 310 may further include a field recording the time at which propagation was generated, for example.

The image search device 104 of the present embodiment generates an additional query using propagation information created during recording and performs a search using a search query in which the additional query was added to the input query, thereby enabling greater image search coverage and improving efficiency for image search and analysis of the image database 108.

Figure 4A:
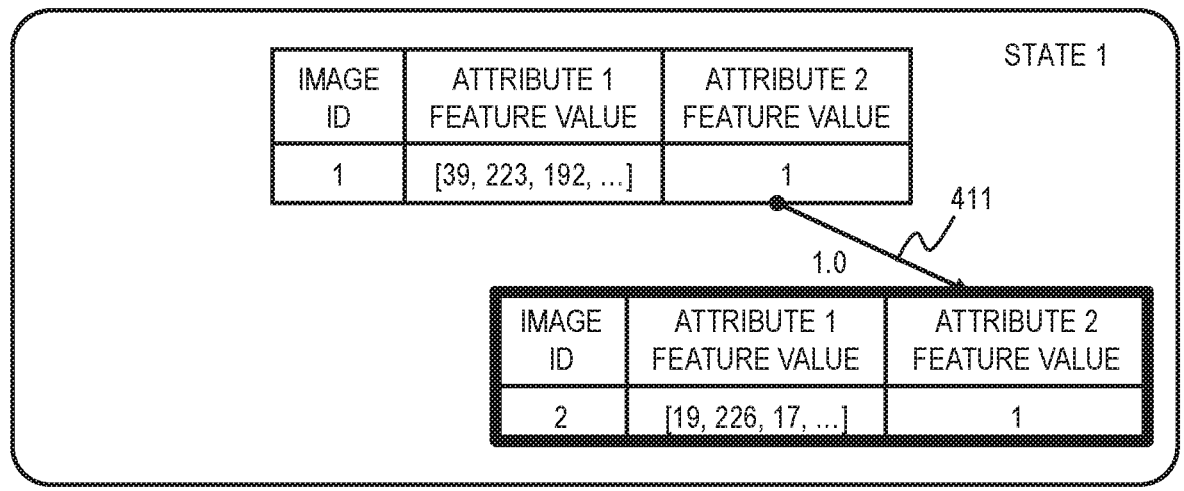
FIG. 4A is an explanatory diagram showing an example of a process of generating attribute propagation information according to Embodiment 1.
Figure 4B:
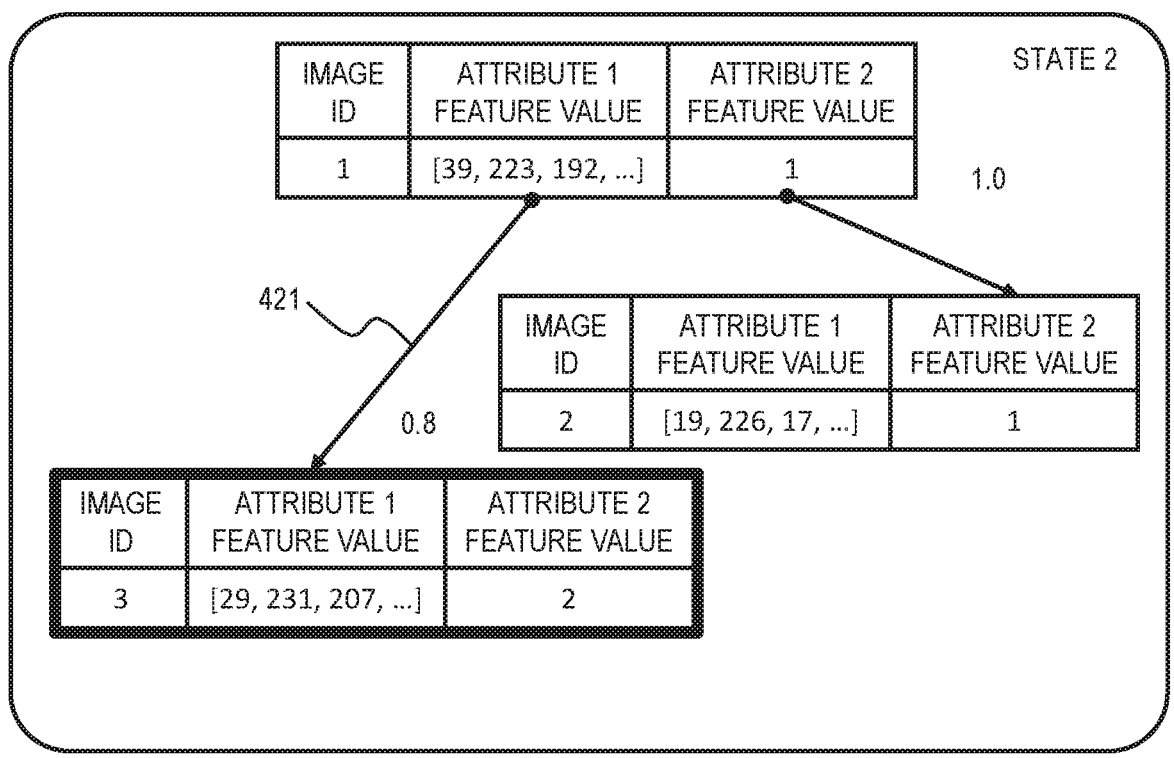
FIG. 4B is an explanatory diagram showing an example of a process of generating attribute propagation information according to Embodiment 1.
Figure 4C:
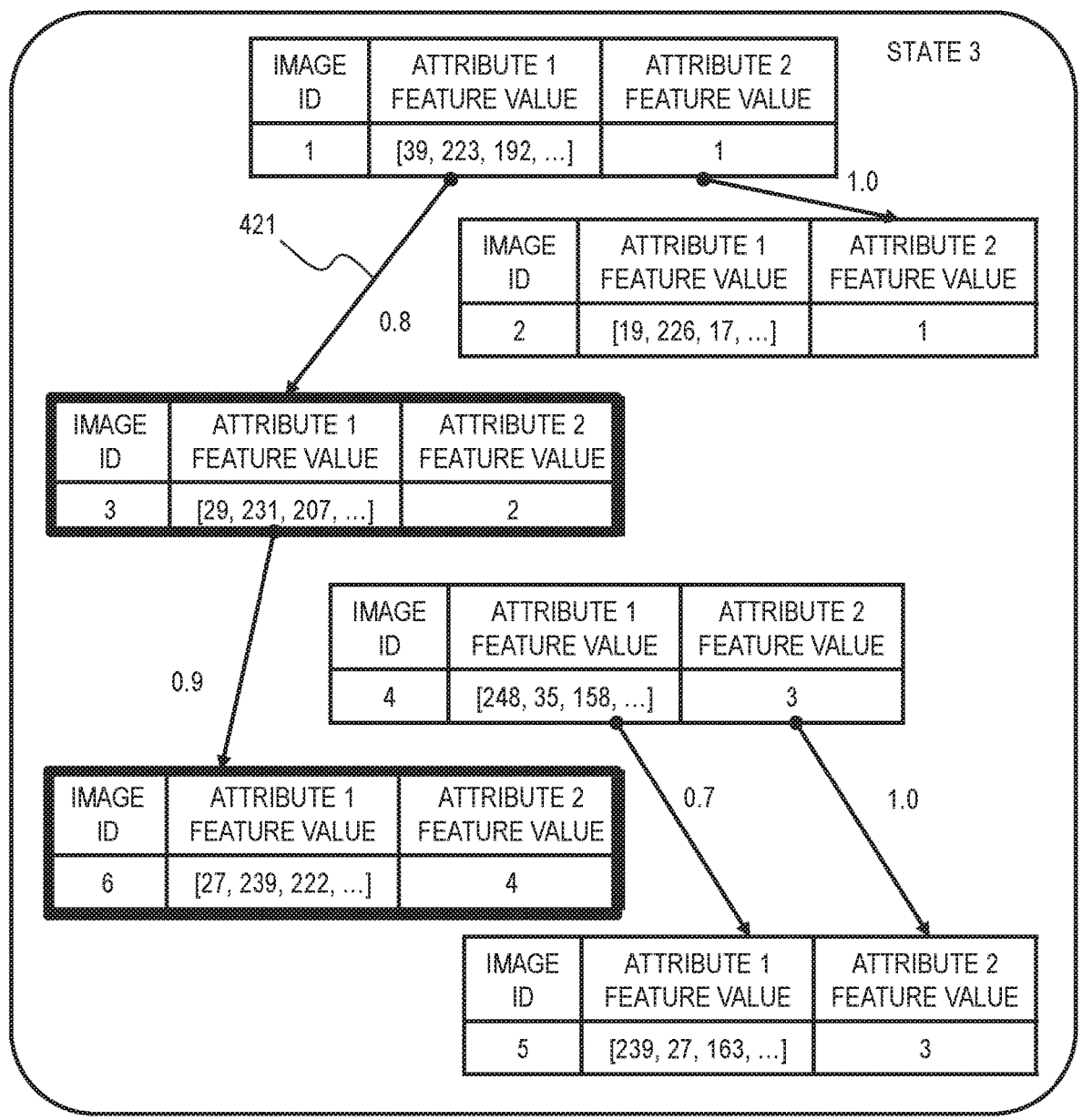
FIG. 4C is an explanatory diagram showing an example of a process of generating attribute propagation information according to Embodiment 1.

FIGS. 4A to 4C are drawings for describing steps in which propagation information is generated in the recording process. FIGS. 4A to 4C show steps by which the state of the image database 108 changes between a state 1 and a state 3 due to the addition of images. Also, FIGS. 4A to 4C show an example in which the degree of similarity between two feature values can be defined and the degree of similarity is adopted as the propagation intensity. Below, an image with an ID of N (N being a natural number) is expressed as an image N.

FIG. 4A shows an example in which the state of the image database 108 is the state 1. The state 1 indicates a state in which an image 2 is added to the image table 300 in which the image 1 has been recorded. The attribute propagation unit 107 compares the same type of feature values and if the degree of similarity is greater than or equal to a prescribed threshold, the propagation information is recorded in the propagation information table 310.

In the example of FIG. 4A, the degree of similarity for the attribute 1 feature value is less than or equal to the threshold, and thus, the attribute propagation unit 107 does not perform propagation. The attribute 2 feature values match, that is, the degree of similarity is greater than or equal to the threshold, and thus, the attribute propagation unit 107 records the propagation information 411. Specifically, the attribute propagation unit 107 records "2" indicating the identifier of the attribute 2 feature value in the attribute ID field 312, records "1" as the ID of the recorded image in the propagation source field 313, records "1" as the ID of the added image to the propagation destination field 314, and records the degree of similarity 1.0 in the propagation intensity field 315.

FIG. 4B shows an example in which the state of the image database 108 is in the state 2. The state 2 indicates a state in which an image 3 is newly recorded in the image table 300. The attribute propagation unit 107 performs feature value comparison between the image 3 and the image 1, and feature value comparison between the image 3 and the image 2. In the example of FIG. 4B, only propagation for the attribute 1 feature value between the image 3 and the image 1 occurs. Therefore, the attribute propagation unit 107 records the propagation information 421 for the attribute 1 feature value. As a result, propagation information 411 relating to the attribute 2 feature value between the image 1 and the image 2 is recorded, and additionally, propagation information 421 relating to the attribute 1 feature value between the image 1 and the image 3 is recorded, and thus, the two pieces of propagation information indicate that there is a relationship between the image 3 and the image 2.

FIG. 4C shows an example in which the state of the image database 108 is in the state 3. The state 3 indicates that an image 4, an image 5, and an image 6 are additionally recorded. As indicated in FIG. 4C, a plurality of graph structures that are linked by propagation information formed by the attribute feature values are formed. In the above process, the image search device 104 may reduce the number of feature value comparisons using the aforementioned clustering, or narrow down the images to be subjected to feature value comparison using bibliography data such as the image recording time, and the recording process speed can be improved.

Figure 5:
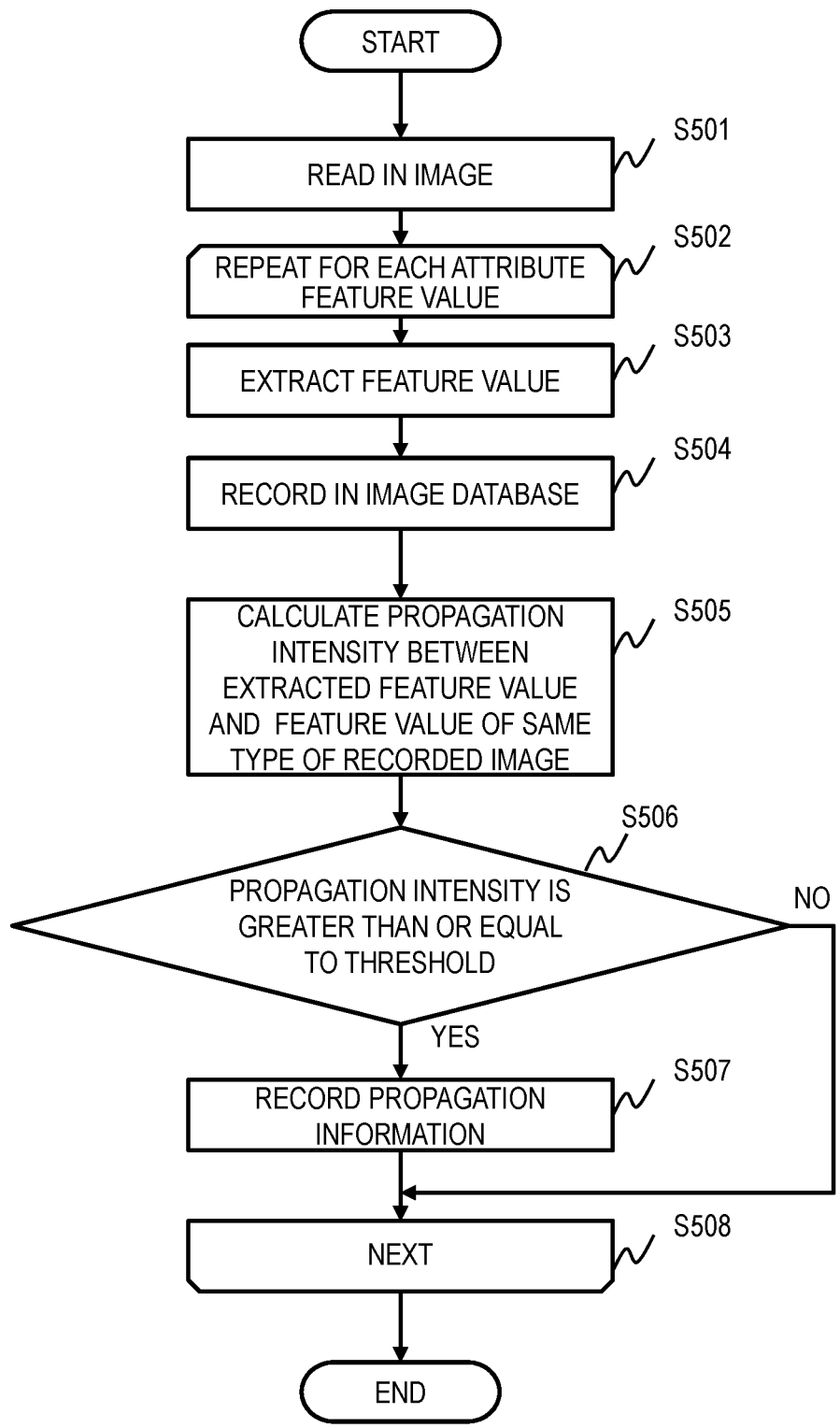
FIG. 5 is a flowchart showing an example of attribute propagation information generation processing according to Embodiment 1.

FIG. 5 is a flowchart showing an example of a process in which the image search device 104 of the present embodiment extracts image feature values and propagation information between images from a video or still images inputted from the image storage device 101 and records them in the image database 108.

The image input unit 105 acquires image data from the image storage device 101, converts the acquired image data to a format that can be used in the system as necessary, and records the image data in the image table 300 (S501). If the image input unit 105 receives video data as input, for example, the image input unit 105 performs a video decoding process that divides the video data into frames (still image data format). Also, the image input unit 105 may, as necessary, perform an extraction process on a partial region.

The image search device 104 repeats the process of steps S503 to S507 for the feature values of each of the prescribed types of attributes applied as a system design matter, for example (S502). The feature value extraction unit 106 calculates the types of feature values from the inputted image (S503). The feature value extraction unit 106 records the feature values attained in step S503 in the image table 300 (S504). The feature value extraction unit 106 may perform a clustering process using feature values as necessary if the number of records in the image table 300 is greater than or equal to a prescribed threshold, for example.

The attribute propagation unit 107 calculates the propagation intensity between the feature value attained in step S503 and a feature value of the same type of each image recorded in the image table 300 (S505), and determines whether the propagation intensity is greater than or equal to a threshold (S506). If there is a recorded image with a propagation intensity that is greater than or equal to the threshold (S506: YES), the attribute propagation unit 107 executes step S507, and if not (S506: NO), then the process progresses to step S508.

The attribute propagation unit 107 records in the propagation information table 310 propagation information indicating the link between the feature value of the recorded image where the propagation intensity is greater than or equal to the threshold and the feature value of the inputted image (S507). If there are attribute feature values for which steps S503 to S507 have not been executed, then the process progresses to step S502 and the process is performed for the feature value of another attribute (S508). If the process of steps S503 to S507 has been executed for the feature values of all attributes, then the process shown in FIG. 5 is ended.

Figure 6:
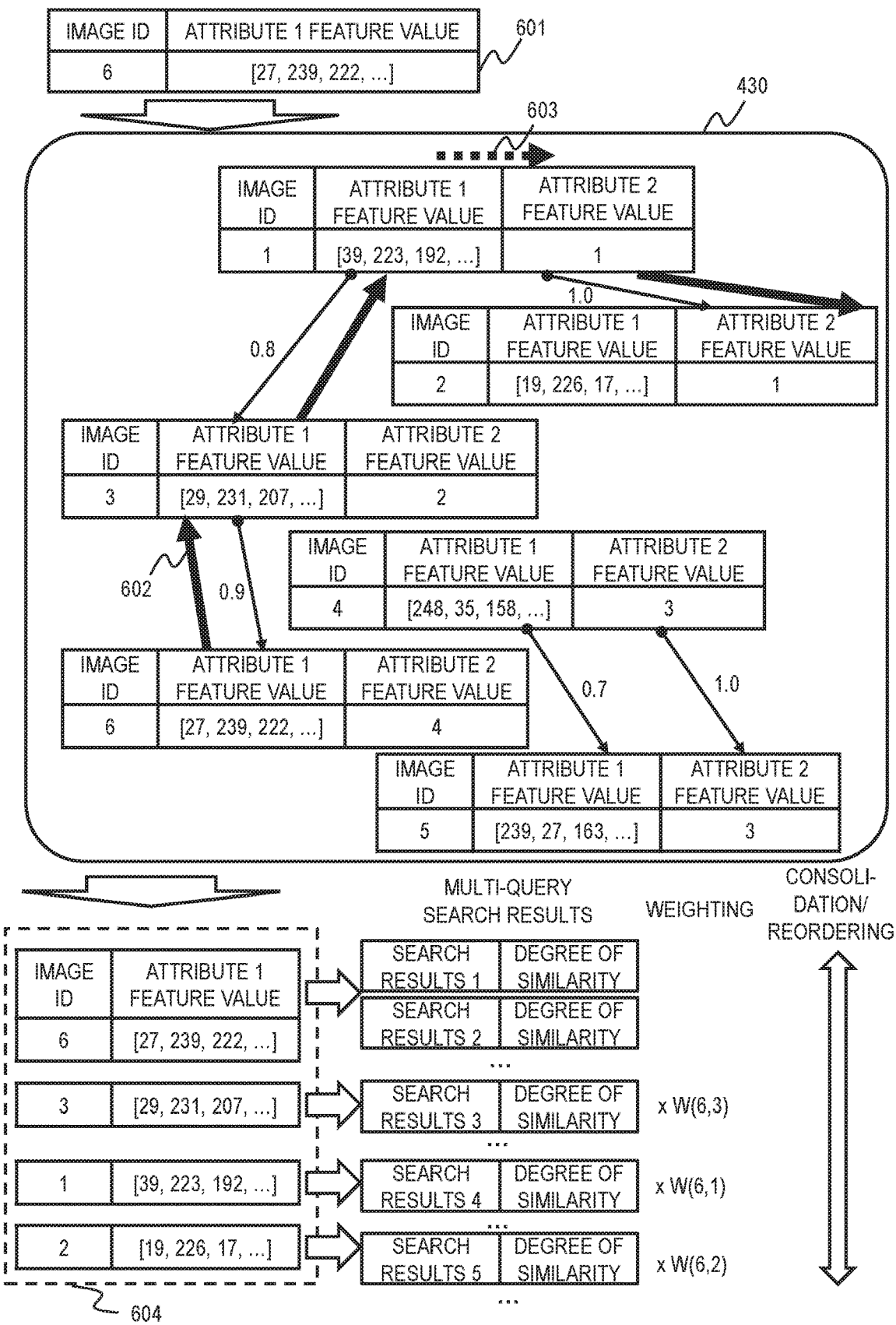
FIG. 6 is an explanatory diagram showing an example of image search with the attribute propagation information according to Embodiment 1.

FIG. 6 shows an example of a process in which the image search device 104 of the present embodiment searches for an image recorded in the image database 108 using a user-designated query. The user inputs information to generate the input query for searching a desired image from the image database 108. The input query includes image feature values stored in the image table 300.

The query input unit 110 receives input of an ID of an image included in the image table 300 and information indicating the type of feature value, and uses the combination of the image ID acquired from the image table 300 and the feature value as the input query. An image corresponding to the image ID included in the input query is referred to as the query image.

The query input unit 110 may receive input of a feature value type and an image newly inputted from outside, for example. At this time, the query input unit 110 performs a similar process to that of the feature value extraction unit 106 and extracts the type of feature value from the inputted image, for example, and designates in the image table 300 one recorded image having a feature value with the highest degree of similarity to the extracted feature value, for example. The query input unit 110 sets as the input query the combination of the ID of the designated recorded image and the type of feature value of the recorded image, for example.

FIG. 6 shows an example in which the image ID of the input query 601 is "6", and the type of feature value is the attribute 1 feature value. The input query 601 may include a plurality of types of feature values. Also, a plurality of images may be designated as query images. The image search device 104 stores information indicating the link between recorded images defined in the propagation information table 310, that is, information of a set of graphs 430 including one or more graphs. The query reinforcing unit 111 selects from the set of graphs 430 a graph including information of a query image designated by the input query 601, and, with the feature value designated by the input query 601 of the query image as the starting point, searches for the selected graphs by traversing the links.

The query reinforcing unit 111 attains the image 3 by traversing the links 602 from the attribute 1 feature value of the image 6 designated by the input query 601. The query reinforcing unit 111 attains a set of images including the image 6, the image 3, the image 1, and the image 2 on the path of the links in order from the feature value of the obtained image.

When traversing the links, the query reinforcing unit 111 may perform attribute switching 603 in the same image and traverse the link of the feature value of the destination attribute. By the query reinforcing unit 111 performing attribute switching 603 within the same image, it is possible to improve the search coverage rate while maintaining the relationship between feature values. Also, FIG. 6 shows the links as being directed links, but the links may be undirected links. In other words, the image search device 104 may perform a search according to a designated direction or may perform a search ignoring the directions shown in FIG. 6. The query reinforcing unit 111 uses a search algorithm such as Dijkstra's algorithm to perform the above search.

The query reinforcing unit 111 sets as the search query 604 a query in which an additional query is added to the input query 601, the additional query being a combination of the IDs of a series of images attained by the above search and the same type of feature values as that of the input query in the images. If the input query 601 includes a plurality of types of feature values, the query reinforcing unit 111 performs searches with each feature value as the starting point and generates a reinforced query for each feature value.

Next, the image search unit 112 performs a similar image search in which an image having a similar feature value is searched from the image table 300 for each feature value included in the search query 604. If each query in the search query 604 includes a plurality of types of feature values, the image search unit 112 may search for images with feature values that are similar to each of the plurality of types of feature values, or may search for images with similar feature values to a feature value attained by combining a plurality of types of feature values, for example. The image search unit 112 attains search results as a combination of the image ID and the degree of similarity between the image having this ID and the ID of the query image of the original search.

The image search unit 112 rearranges all of the obtained search results in order of degree of similarity and outputs the search results to the display device 103, for example. At this time, the image search unit 112 may output only search results with a degree of similarity greater than or equal to a prescribed threshold among search results with the same image ID, for example.

Also, when rearranging the search results in order of degree of similarity, the image search unit 112 may weight the degree of similarity of the search results according to the propagation intensity of the used query image from the input query image. The propagation intensity from the image 3 to the image 6 is 0.9, and thus, the image search unit 112 assigns a weight of 0.9 to the degree of similarity of the search results for when the query image is the image 3, for example.

Also, the image search unit 112 assigns, on the degree of similarity of search results attained by traversing a plurality of pieces of propagation information from the image 6 that is the query image of the input query 601, a weighting equal to the product of the plurality of pieces of propagation information. Also, the image search unit 112 may calculate the propagation intensity between the feature value of the image 6 that is the input query and the feature value of the images in the search results for the degree of similarity of the search results attained by performing attribute switching, and use the calculated propagation intensity as the weight, for example. By the image search unit 112 weighting the degree of similarity, the degree of similarity of images close to the query image of the input query 601 initially designated by the user becomes higher.

Figure 7:
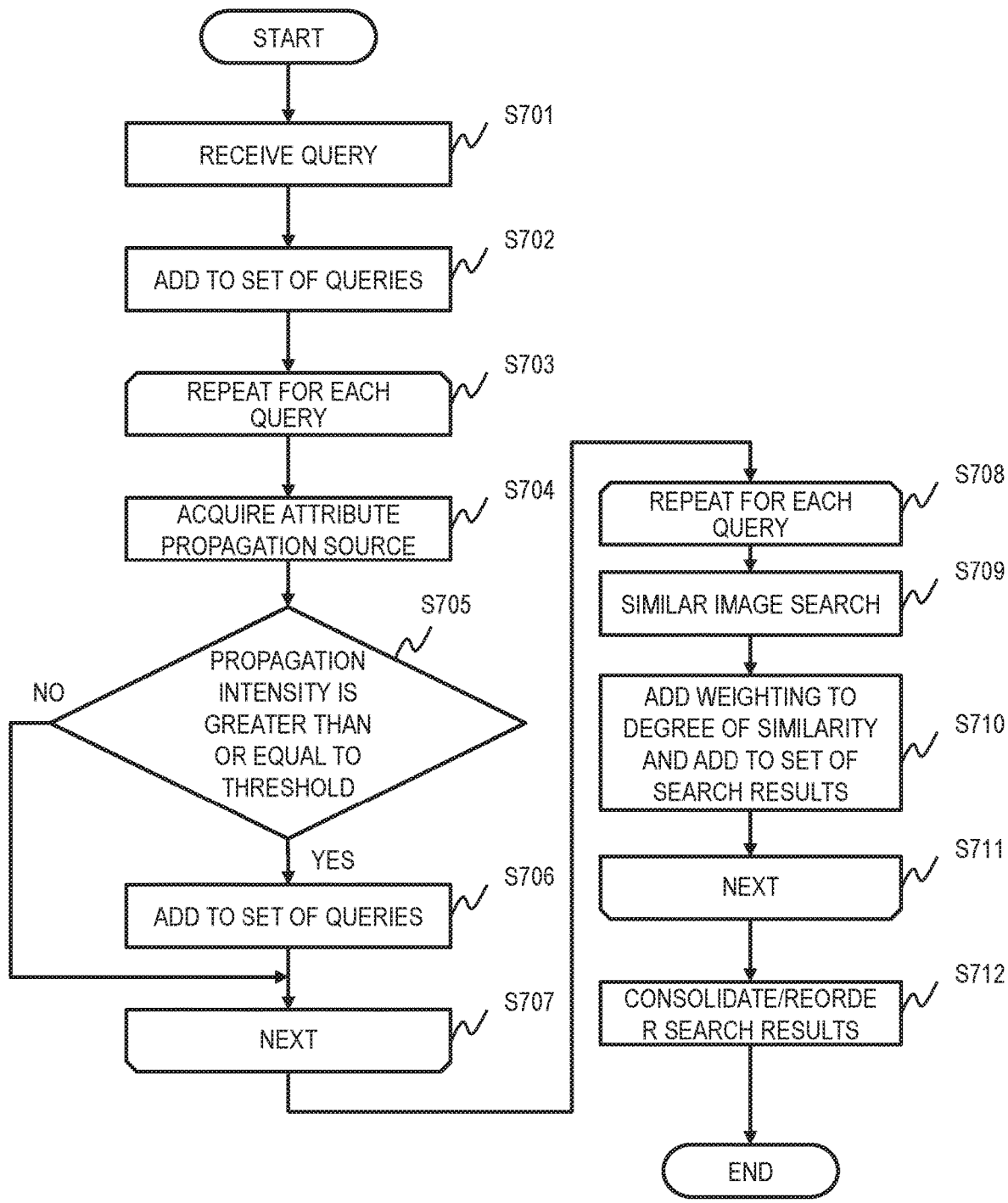
FIG. 7 is a flowchart showing an example of image search processing with the attribute propagation information according to Embodiment 1.

FIG. 7 is a flowchart for explaining an example of a process in which the image search device 104 of the present embodiment searches for an image recorded in the image database 108 using a user-designated query. The respective steps of FIG. 7 will be described below.

The query input unit 110 receives information for generating an input query from the user, and generates the input query (S701). If the query input unit 110 receives an input including the ID of the recorded image and the type of feature value, then the query input unit 110 acquires the type of feature value of an image having the image ID from the image table 300. If the query input unit 110 receives an input including external image data and the type of feature value, then the query input unit 110 acquires the ID of the image having a feature value similar to the type of feature value extracted from the image, and the type of feature value of an image having the image ID from the image table 300. The query input unit 110 sets as the input query the combination of the ID of the query image and the prescribed feature value, for example.

The query reinforcing unit 111 adds the input query attained in step S701 to an empty set of queries (S702). The query reinforcing unit 111 executes the process of steps S704 to S706 for each query included in the set of queries (S703). The query reinforcing unit 111 sets the query image as the propagation source and propagation destination and acquires from the propagation information table 310 propagation information having an attribute ID corresponding to the type of feature value (S704).

The query reinforcing unit 111 determines whether among the acquired pieces of propagation information are included propagation information with a propagation intensity greater than or equal to a threshold (S705). If there is propagation information with a propagation intensity greater than or equal to the threshold (S705: YES), then step S706 is executed, and if not (S705: NO), then the process progresses to step S707. The query reinforcing unit 111 uses a prescribed value from the system or a value that the user inputted as a search parameter as the threshold, for example. The threshold may be a value that differs for each attribute ID, for example.

The query reinforcing unit 111 adds to the set of queries a query in which an image having a propagation intensity of greater than or equal to the threshold is set as the query image (S706). If the time at which the propagation was generated is recorded in the propagation information table 310, then the query reinforcing unit 111 may eliminate from the set of queries images in which the time at which the propagation was generated is within a prescribed time period from the current time.

If the process of steps S704 to S706 has been executed for all queries in the set of queries, then the process progresses to step S708, and if there are queries for which the process of steps S704 to S706 has not been executed, then the process returns to step S704 and the process is executed for such queries (S707).

The image search unit 112 executes the process of steps S709 and S710 for all queries included in the set of queries (S708). For queries in which the propagation intensity is greater than or equal to a prescribed threshold (the threshold being greater than the threshold of step S705; queries with a high degree of similarity), for example, a process may be adopted in which the image search unit 112 only processes a prescribed number of randomly selected queries, and skips the remaining queries in the process of steps S708 and S709. The similar image search results for each of the two queries with very high propagation intensities have a high probability of being similar. Thus, by the image search unit 112 performing the search process on only one of the two queries with propagation intensities greater than the threshold, for example, it is possible to shorten the search time while mitigating a decrease in search coverage rate.

The image search unit 112 acquires a similar image from the image database 108 by performing an image search using the query. The image search unit 112 acquires a combination of the similar image ID as the search result, and the degree of similarity between the feature value of the query image and the feature value of the similar image (S709).

The image search unit 112 applies a weighting corresponding to the propagation intensity between the aforementioned query and the input query on the similar image attained in step S709, and adds the weighting to the set of search results (S710). The image search unit 112 may switch whether or not to execute the process of step S710 according to a search parameter set by the user, for example.

If the process of steps S709 and S710 has been executed for all queries included in the set of queries, then the process progresses to step S712, and if there are queries for which the process of steps S709 and S710 has not been executed, then the process returns to step S709 and the process is executed on such queries (S711).

The image search unit 112 reorders the search results in order of degree of similarity (if the degree of similarity is weighted, then the weighted degree of similarity is used), the search results are displayed in the display device 103, and the process is ended (S712). In this case, if the image search unit 112 attains a plurality of search results including images having the same ID, then a process may be adopted in which only a prescribed number of search results are left remaining and consolidated.

Figure 8:
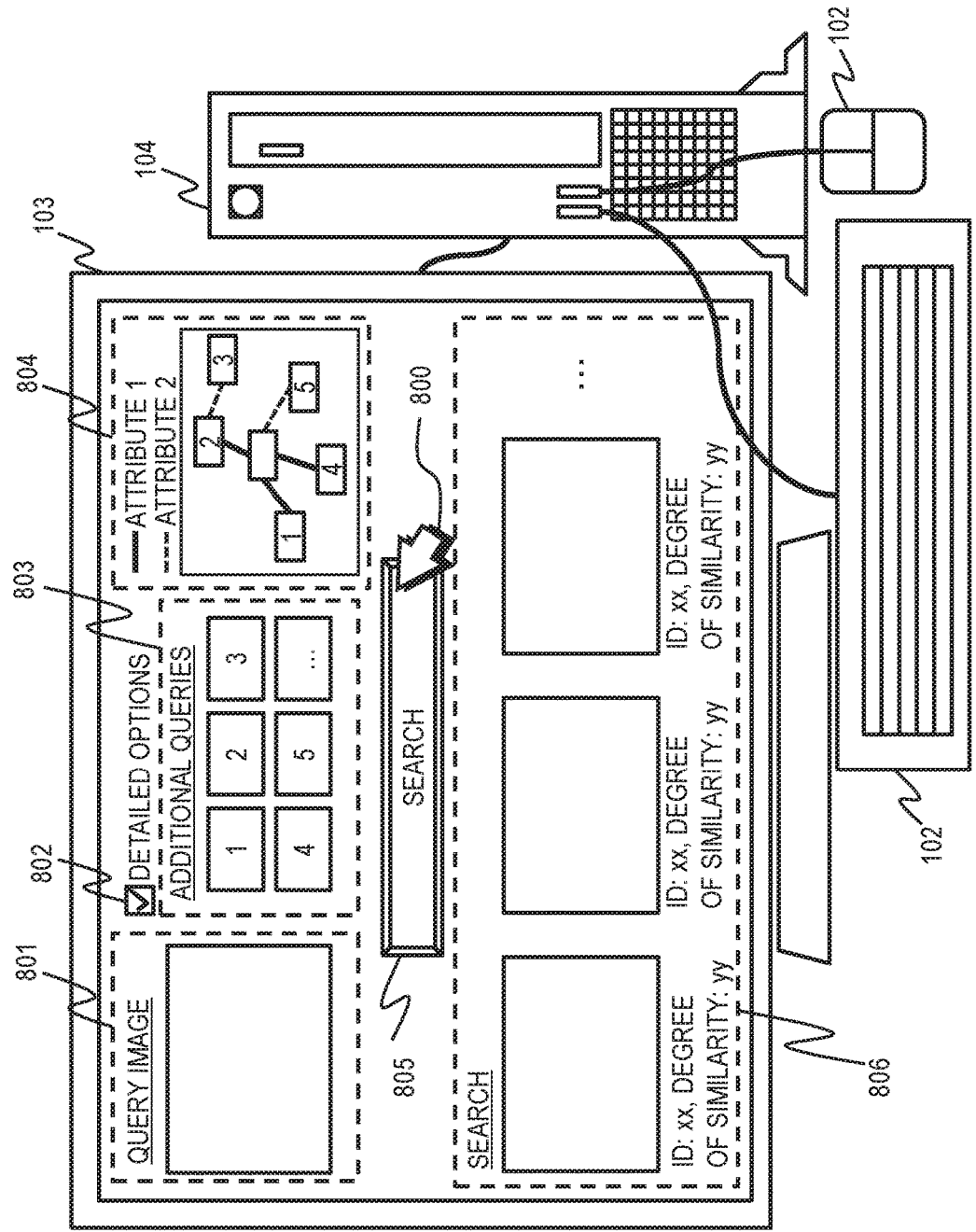
FIG. 8 is a diagram showing an example of a screen for performing an image search according to Embodiment 1.

FIG. 8 shows a configuration example of an operation screen for performing an image search using the image search device 104 of the present embodiment. The operation screen is displayed to the user on the display device 103, for example. The user uses the input device 102, for example, to operate a cursor 800 displayed on the screen to issue process commands to the image search device 104.

The operation screen includes a query image display region 801, a detailed option display button 802, an additional query display region 803, a propagation information display region 804, a search button 805, and a search result display region 806. The information displayed in the query image display region 801 is outputted to the display device 103 by the query input unit 110, for example. The information displayed in the additional query display region 803 and the propagation information display region 804 is outputted to the display device 103 by the query reinforcing unit 111, for example. The information displayed in the search result display region 806 is outputted to the display device 103 by the image search unit 112, for example.

First, the user selects an image to aid the search. The operation screen may display a dialog box for selecting a recorded image, or may include an interface for inputting an external image, for example. The image selected by the user is displayed in the query image display region 801.

The query reinforcing unit 111 generates an additional query using the propagation information of the query image selected by the user. The additional query display region 803 displays information of the generated additional query such as the query image and feature value of the additional query, for example. By the additional query display region 803 displaying information about the additional query, the user can determined whether the additional query is appropriate. If the user checks the detailed option display button 802, for example, then the additional query display region 803 may display information of the additional query.

The propagation information display region 804 displays propagation information indicating whether the query image is the propagation source or the propagation destination, for example. By the propagation information display region 804 displaying the propagation information, information regarding how the additional query was attained can be conveyed to the user intuitively. The operation screen may be configured such that if the user determines that the additional query displayed in the additional query display region 803 is not appropriate as an additional query, the user can eliminate the query by operating the additional query display region 803 or the propagation information display region 804.

When the user clicks on the search button 805, the image search unit 112 performs a similar image search using the input query and the search query on the image database 108. Search results are rearranged in order of degree of similarity, for example, and search results having the same image ID are consolidated and displayed in the search result display region 806.

Figure 9:
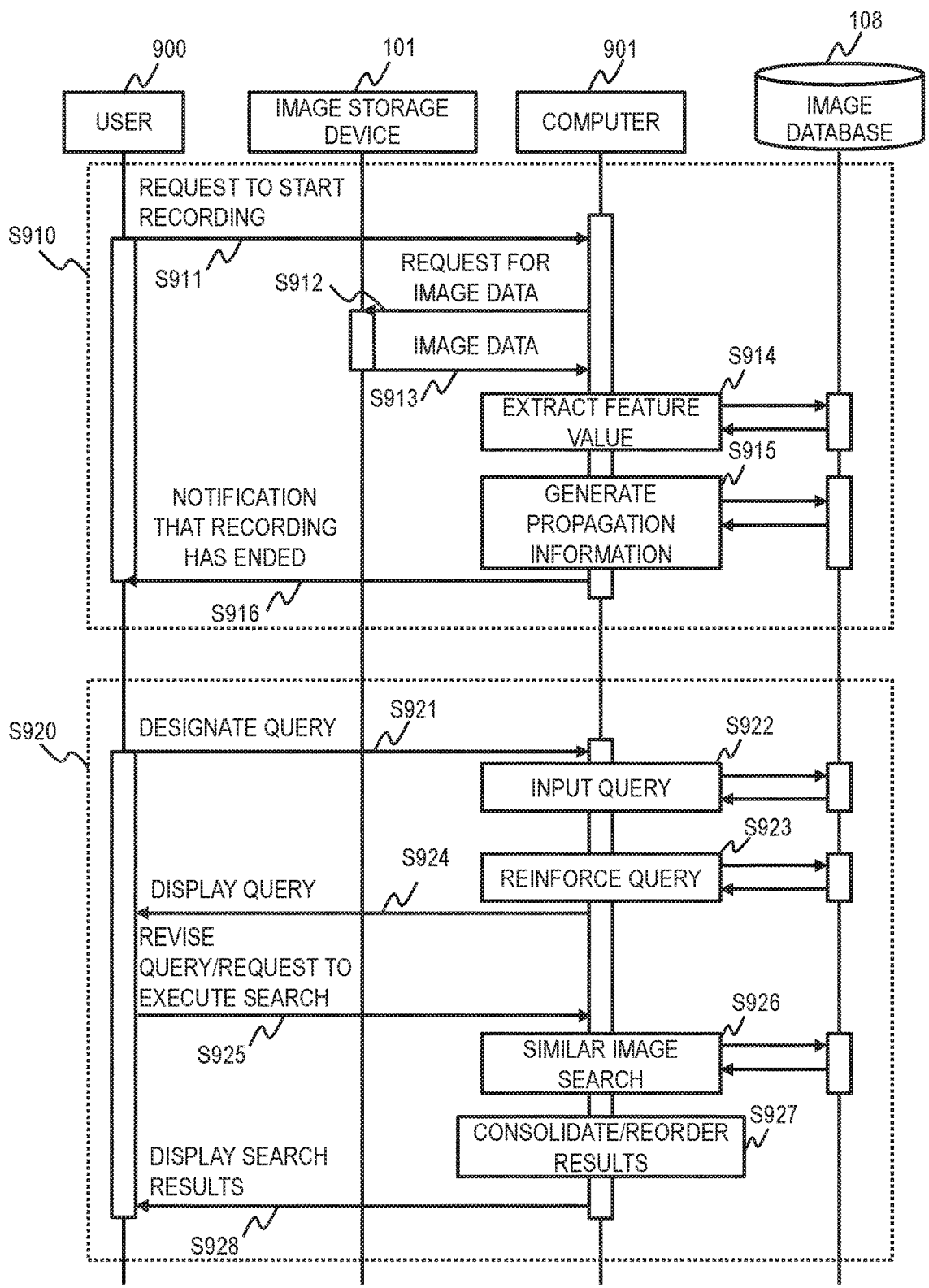
FIG. 9 is a sequence diagram showing an example of a process of the image search system according to Embodiment 1.

FIG. 9 is a sequence diagram explaining an example of a process of the image search system 100 of the present embodiment. FIG. 9 specifically shows a process sequence among a user 900, the image storage device 101, a computer 901, and the image database 108 in image recording and image search processes in the image search system 100. The computer 901 serves as the image search device 104. The user 900 transmits requests and commands to the computer 901, inputs data, and the like through the input device 102, for example, and is presented through the display device 103 with processing results and the like from the computer 901.

In FIG. 9, S910 refers to the recording process and S920 refers to the search process. The recording process S910 includes the process of steps S911 to S916. When the user 900 issues a recording start request (S911), the computer 901 issues an image data acquisition request to the image storage device 101 (S912), and acquires image data from the image storage device 101 (S913).

The process of steps S914 to S916 stated below corresponds to the series of recording processes described in FIG. 5. The computer 901 extracts the feature values from the acquired images and records the feature values and image data in the image database 108 (S914). Next, the computer 901 compares the feature value of the acquired image to the same type of feature value of an image recorded in the image database 108, and records a link between feature values having a high propagation intensity and the propagation intensity of the link to the image database 108 as propagation information (S915). When the recording process ends, the computer 901 notifies the user 900 that recording is complete (S916).

The search process S920 includes the process of steps S921 to S928, and corresponds to the series of search processes described in FIG. 7. When the user 900 issues the search request to the computer 901 (S921), the computer 901 reads data of the query image from the image database 108 (S922). Also, if the computer 901 receives external images in the search request, the computer 901 extracts the feature value of the image, and selects an image with a high degree of similarity to the feature value from the image database 108 and sets the selected image as the query image, for example.

Next, the computer 901 searches the image database 108 using the propagation information, and adds the image acquired by the search to the set of queries (S923). The additional query is displayed to the user 900 (S924), and the user 900 revises the query as necessary and sends a search execution request to the computer 901 (S925). The computer 901 executes the similar image search using each image feature value in the set of queries (S926). The computer 901 reorders the acquired search results in order of degree of similarity and consolidates search results having the same image ID (S927), and displays the search results to the user 900 (S928).

The image search device 104 of the present embodiment compares the one or more types of feature values of the inputted image with the feature values of recorded images, generates propagation information indicating a link between highly similar images, and records the propagation information in the image database 108. The image search device 104 uses the search query acquired by reinforcing the input query on the basis of the propagation information and performs the similar image search, thereby increasing the coverage rate of the search while maintaining search accuracy.

Embodiment 2

Whereas the image search device 104 of Embodiment 1 generates propagation information when recording the image, an image search device 104 of the present embodiment can update the propagation information after recording the image or add propagation information for new attributes.

Figure 10:
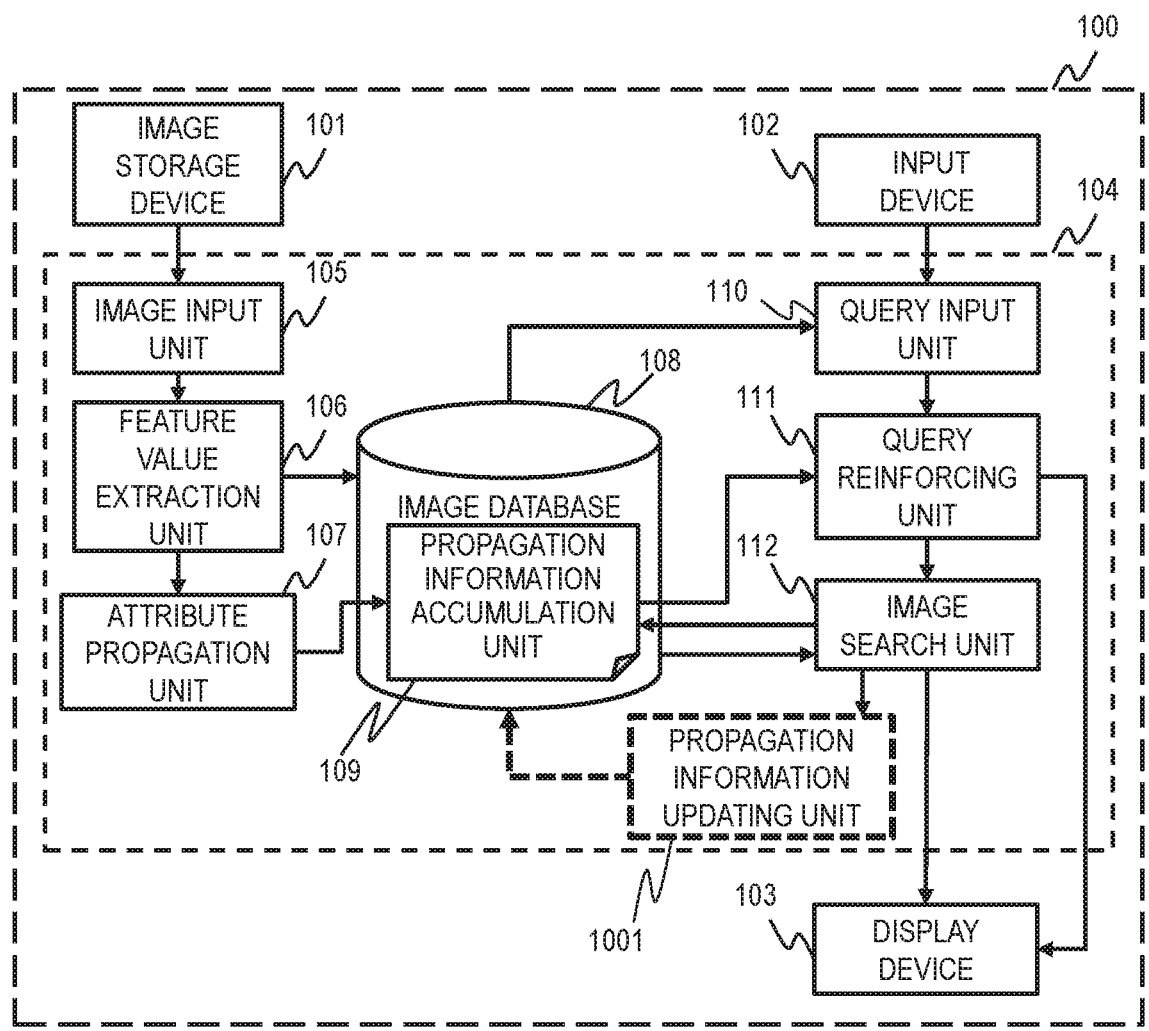
FIG. 10 is a block diagram showing a configuration example of an image search system according to Embodiment 2.

FIG. 10 is a block diagram showing a configuration example of an image search system of the present embodiment. An image search system 100 adds attributes and updates propagation information using image search. The image search system 100 of the present embodiment includes a propagation information updating unit 1001 in addition to the configuration of the image search system 100 of Embodiment 1. The propagation information updating unit 1001 applies the attributes and propagation information to an image included in search results attained in the search process by the image search unit 112, for example. The propagation information updating unit 1001 applies propagation information between the query image and an image in the search results attained by the image search unit 112 according to a user command, for example.

Figure 11:
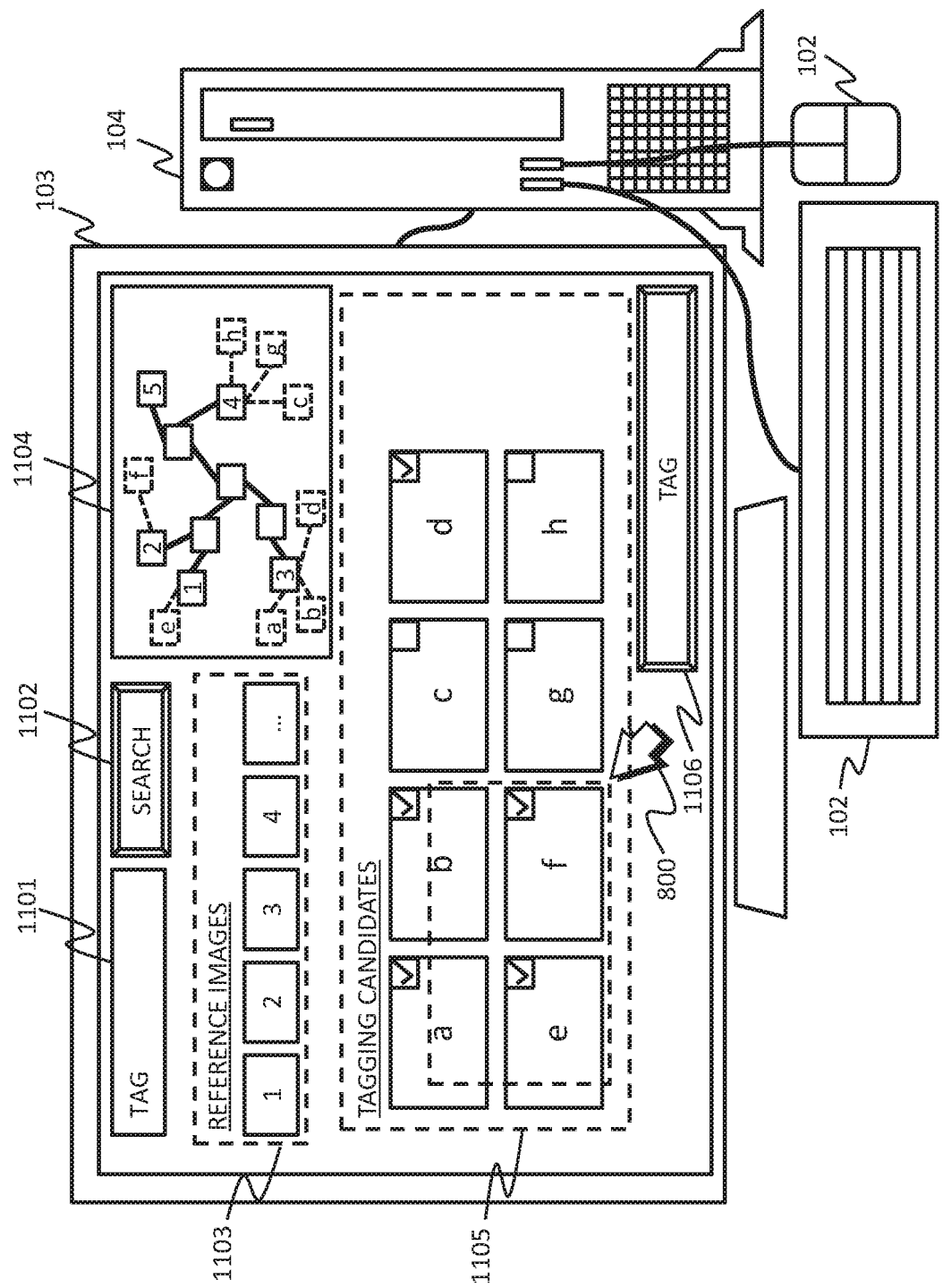
FIG. 11 is a diagram showing a configuration example of annotation screen according to Embodiment 2.

FIG. 11 is a screen configuration example for performing annotation of an image using a propagation information addition function. Annotation is a task of adding, to an image, tags such as terms or sentences describing the image, and is performed for classification and searching of images by tag, analysis of the database, and the like. If a sufficient number of combinations of images and tags are attained, then it is possible to create an image identification unit that recognizes unknown images by machine learning. The annotation support screen of FIG. 11 is for propagating tags by human judgment if correct tagging cannot be anticipated by automated determination according to image similarity.

The annotation screen includes a tag input region 1101, a search button 1102, a reference image display region 1103, a propagation information display region 1104, a tagging candidate display region 1105, and a tagging button 1106. The information displayed in the reference image display region 1103 and the propagation information display region 1104 is outputted to the display device 103 by the query reinforcing unit 111, for example. The information displayed in the tagging candidate display region 1105 is outputted to the display device 103 by the image search unit 112, for example.

When the user inputs a tag in the tag input region 1101 and clicks the search button 1102, the query reinforcing unit 111 acquires an image having the input tag as the reference image. The reference image display region 1103 displays the reference image. Next, the image search unit 112 performs a similar image search by a prescribed feature value other than the input tag with each reference image as a query, and acquires from the image database 108 a similar image to which the input tag has not been applied.

The image search unit 112 reorders the search results including the combination of similar image and degree of similarity in order of degree of similarity, for example. The search results are similar to the tagged image, and thus, it is possible to consider these as candidate images to which the same tag should be applied. The tagging candidate display region 1105 displays the search results. Also, the query reinforcing unit 111 may acquire the propagation information between the reference image and the candidate image with reference to the propagation information table 310. The propagation information display region 1104 displays the propagation information acquired by the query reinforcing unit 111.

By the propagation information display region 1104 making the propagation information visible, it becomes easy to find the reference image that is the cause for the user selecting the wrong candidate, for example. In the example of FIG. 11, the candidate images c, g, and h have a propagation relationship with the reference image 4, and there is a possibility that the reference image 4 itself has the wrong tag. The annotation screen may highlight such images.

The user checks the images displayed in the tagging candidate display region 1105 and selects images to which the input tag should be applied. The selection operation may be performed by dragging and dropping using a mouse or by clicking on checkboxes. Next, the user clicks on the tagging button 1106 and applies the tag on the selected images. The image search device 104 writes the input tag to the selected image as the attribute feature value, and adds propagation information with the reference image.

Figure 12:
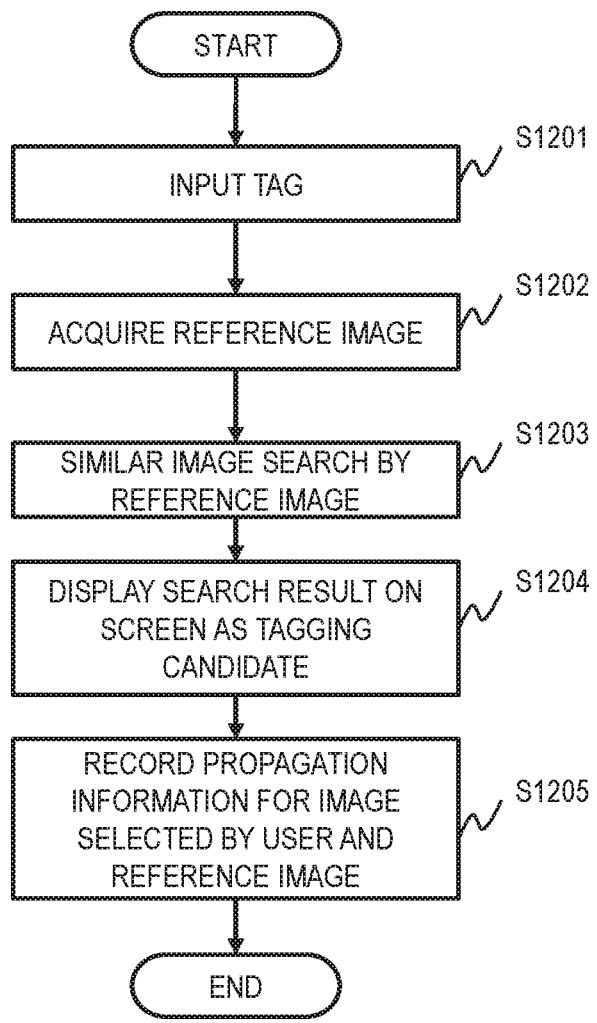
FIG. 12 is a flowchart showing an example of annotation processing according to Embodiment 2.

FIG. 12 is a flowchart showing one example of an annotation process. The respective steps of FIG. 12 will be described below. The query input unit 110 acquires the tag inputted by the user (S1201).

The query reinforcing unit 111 acquires a prescribed number of images to which the input tag was applied from the image database 108, and forms a set of queries including a number of queries equal to the prescribed number of images, the queries being constituted of a combination of IDs of the acquired images and a prescribed number of types of feature values other than those of the input tag (S1202). At this time, the query reinforcing unit 111 may select a query image to be included in the set of queries using the propagation information. For example, the degree of similarity between feature values of a piece of propagation information is high, and thus, an image having the feature value of the tag has a high probability of being redundant as a reference image. Thus, the query reinforcing unit 111 selects only one of the adjacent images in the graph structure of the propagation information as the query image, for example. In this manner, the query reinforcing unit 111 can attain reference images with a high degree of variation with the same tag.

The image search unit 112 executes similar image search using a prescribed number of types of feature values of the reference images attained in step S1202 (S1203). The image search unit 112 reorders the search results in order from highest degree of similarity, for example, and consolidates search results having the same image ID. The image search unit 112 may consolidate and output similar search results, and as a result, the image search unit 112 can reduce the number of search results displayed while maintaining variation in the search results.

The image search unit 112 displays in the display device 103 an image included in the search results as a candidate image to be tagged (S1204). The user selects an image to be tagged from among the candidate images and sends the image to the system. At this time, the display device 103 may highlight the reference image that is the propagation source or propagation destination when the candidate image has been selected, and this makes it easier for the user to confirm the propagation information. If the propagation information automatically created by the method of Embodiment 1 is inconsistent with the propagation information designated by the user, then the image search device 104 may issue an alert.

The propagation information updating unit 1001 tags the images selected by the user (S1205). The propagation information updating unit 1001 adds the propagation information between the tags applied to the reference images and the newly applied tags. In other words, the propagation information updating unit 1001 stores an ID indicating the input tag in the attribute ID field 312 of the propagation information table 310, stores the image ID of the query image in the propagation source field 313, stores the selected image in the propagation destination field 314, and stores a value (such as 1.0) designated by the user as the propagation intensity, for example.

The image search device 104 of the present embodiment can update the propagation information after recording the image. In particular, the image search device 104 of the present embodiment can perform a highly accurate and comprehensive search of candidate images to be tagged when performing annotation.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. An image search device that searches an image from an image database that stores a recorded image, one or more types of feature values including a first type of said recorded image, and propagation information that indicates a link between a same type of the feature values of the recorded image, the image search device comprising:
    an image acquisition unit that acquires a first image and the one or more types of feature values of the first image, and records the first image and the feature values in the image database;
    an attribute propagation unit that calculates a propagation intensity indicating similarity or sameness between the types of feature values of the recorded image and the types of feature values of the first image, and includes in the propagation information a link between the types of feature values of the first image and the types of feature values of the recorded image for which the propagation intensity between the types of feature values of the recorded image and the types of feature values of the first image is at a maximum value;
    a query input unit that acquires a first feature value of a first type from the feature values of the recorded image stored in the image database and generates an input query including the first feature value;
    a query reinforcing unit that, on the basis of a correspondence indicated by the propagation information, performs a search that traverses the feature values of the recorded image starting with the first feature value, and generates an additional query including the first type of feature value of the recorded image that has feature values on a path of the search; and
    an image search unit that searches for images from the image database using the input query and the additional query.

2. The image search device according to claim 1, wherein the query reinforcing unit traverses different types of feature values of the same recorded image during the search.

3. The image search device according to claim 1, wherein the propagation information stored in the image database includes the propagation intensity of each of the links between the same type of feature values of the recorded image,
    wherein the attribute propagation unit includes in the propagation information the propagation intensity of the links included in the propagation information, and
    wherein the image search unit
    calculates a degree of similarity that indicates a similarity between the feature values of the input query and the additional query, and the first type of feature value of the recorded image,
    applies, to each calculated degree of similarity, a weighting based on the propagation intensity indicated by the propagation information between the feature values of the input query and the additional query used in calculating the degree of similarity on the path of the search, and the first feature value, and
    searches for an image from the image database on the basis of the weighted degree of similarity.

4. The image search device according to claim 1, wherein the propagation information stored in the image database includes the propagation intensity of each of the links between the same type of feature values of the recorded image, wherein the attribute propagation unit includes in the propagation information the propagation intensity of the links included in the propagation information, and wherein, if a combination of feature values included in the input query or the additional query exists that has a propagation intensity indicated by the propagation information that is greater than or equal to a threshold on the path of the search, then the image search unit searches for the image from the image database by using one of the feature values included in the combination to.

5. The image search device according to claim 1, wherein the query reinforcing unit acquires the recorded images having the feature values of the additional query from the image database, and outputs the acquired recorded images and information indicating the path of the search.

6. The image search device according to claim 1, wherein the one or more types of feature values include a second type of feature value indicating whether a first tag is applied to the image, and a third type of feature value differing from the second type of feature value, wherein the query reinforcing unit identifies a recorded image to which the first tag is applied from the image database and acquires the third type of feature value for each identified recorded image, wherein the image search unit searches for candidate images to be tagged from the image database by using the query including the acquired third type of feature value and, and wherein the image search device comprises a propagation information updating unit that applies the first tag to a second image included among the candidate images to be tagged, and that includes in the propagation information a link between the first tag applied to the second image and the first tag applied to the identified recorded image.

7. The image search device according to claim 6, wherein the query reinforcing unit acquires from the image database the identified recorded images and the third type of feature value of the candidate images to be tagged, acquires a link between each of the acquired third type of feature value, and each of the third type of feature value of the candidate images to be tagged with reference to the propagation information, and outputs the identified recorded images and information indicating the acquired link, and wherein the image search unit outputs the candidate image to be tagged.

8. A method, by an image search device, for searching an image from an image database that stores a recorded image, one or more types of feature values including a first type of said recorded image, and propagation information that indicates a link between a same type of the feature values of the recorded image, the method comprising:

a step of acquiring, by the image search device, a first image and the one or more types of feature values of the first image;

a step of recording, by the image search device, the first image and the feature values in the image database;

a step of calculating, by the image search device, a propagation intensity indicating similarity or sameness between the types of feature values of the recorded image and the types of feature values of the first image;

a step of including, by the image search device, in the propagation information a link between the types of feature values of the first image and the types of feature values of the recorded image for which the propagation intensity between the types of feature values of the recorded image and the types of feature values of the first image is at a maximum value;

a step of acquiring, by the image search device, a first feature value of a first type from the feature values of the recorded image stored in the image database;

a step of generating, by the image search device, an input query including the first feature value;

a step of performing, by the image search device, on the basis of a correspondence indicated by the propagation information, a search that traverses the feature values of the recorded image starting with the first feature value;

a step of generating, by the image search device, an additional query including the first type of feature value of the recorded image that has feature values on a path of the search; and a step of searching, by the image search device, for images from the image database using the input query and the additional query.

9. The method according to claim 8, wherein the step of generating includes traversing, by the image search device, an additional query different types of feature values of the same recorded image during the search.

10. The method according to claim 8, wherein the propagation information stored in the image database includes the propagation intensity of each of the links between the same type of feature values of the recorded image, wherein the step of including includes including, by the image search device, in the propagation information the propagation intensity of the links included in the propagation information, and wherein the step of searching includes calculating, by the image search device, a degree of similarity that indicates a similarity between the feature values of the input query and the additional query, and the first type of feature value of the recorded image, applying, by the image search device, to each calculated degree of similarity, a weighting based on the propagation intensity indicated by the propagation information between the feature values of the input query and the additional query used in calculating the degree of similarity on the path of the search, and the first feature value, and searching, by the image search device, for an image from the image database on the basis of the weighted degree of similarity.

11. The method according to claim 8, wherein the propagation information stored in the image database includes the propagation intensity of each of the links between the same type of feature values of the recorded image, wherein the step of including includes including, by the image search device, in the propagation information the propagation intensity of the links included in the propagation information, and wherein, if a combination of feature values included in the input query or the additional query exists that has a propagation intensity indicated by the propagation information that is greater than or equal to a threshold on the path of the search, then the step of searching includes searching, by the image search device, for the image from the image database by using one of the feature values included in the combination to.

12. The method according to claim 8, further comprising:

a step of acquiring the recorded images having the feature values of the additional query from the image database; and a step of outputting the acquired recorded images and information indicating the path of the search.

13. The method according to claim 8, wherein the one or more types of feature values include a second type of feature value indicating whether a first tag is applied to the image, and a third type of feature value differing from the second type of feature value, the method further comprising:

a step of identifying, by the image search device, a recorded image to which the first tag is applied from the image database;

a step of acquiring, by the image search device, the third type of feature value for each identified recorded image;

a step of searching, by the image search device, for candidate images to be tagged from the image database by using the query including the acquired third type of feature value;

a step of applying, by the image search device, the first tag to a second image included among the candidate images to be tagged; and a step of including, by the image search device, in the propagation information a link between the first tag applied to the second image and the first tag applied to the identified recorded image.

14. The method according to claim 13, further comprising:

a step of acquiring, by the image search device, from the image database the identified recorded images and the third type of feature value of the candidate images to be tagged;

a step of acquiring, by the image search device, a link between each of the acquired third type of feature value, and each of the third type of feature value of the candidate images to be tagged with reference to the propagation information;

a step of outputting, by the image search device, the identified recorded images and information indicating the acquired link; and a step of outputting, by the image search device, the candidate image to be tagged.

* * * * *